(12) United States Patent
Torres Cantón et al.

(10) Patent No.: US 8,957,550 B2
(45) Date of Patent: Feb. 17, 2015

(54) SIGNAL INJECTION THROUGH ELECTRIC NETWORK USING DIFFERENT MODES

(71) Applicant: Marvell Hispania, S.L.U., Paterna (ES)

(72) Inventors: Luis Manuel Torres Cantón, Valencia (ES); Salvador Iranzo Molinero, Valencia (ES); Agustin Badenes Corella, Castellón (ES); José Maria Vidal Ros, Valencia (ES); Jorge Vicente Blasco Claret, Valencia (ES); José Luis Gonzáles Moreno, Xirivella (ES); Lars Torsten Berger, Mas Tell-Rosari-Paterna (ES)

(73) Assignee: Marvell Hispania, S.L.U., Madrid (ES)

( * ) Notice: Subject to any disclaimer, the term of this patent is extended or adjusted under 35 U.S.C. 154(b) by 0 days.

(21) Appl. No.: 14/083,737

(22) Filed: Nov. 19, 2013

(65) Prior Publication Data

US 2014/0079143 A1    Mar. 20, 2014

Related U.S. Application Data

(63) Continuation of application No. 12/672,863, filed as application No. PCT/ES2008/000496 on Jul. 14, 2008, now Pat. No. 8,587,159.

(51) Int. Cl.
*H01B 7/30* (2006.01)
*H01B 11/02* (2006.01)
(Continued)

(52) U.S. Cl.
CPC .. *H04B 3/54* (2013.01); *H04B 3/32* (2013.01); *H04L 25/0272* (2013.01); *H04L 5/143* (2013.01); *H04L 25/0276* (2013.01); *H04L 5/0007* (2013.01); *H04J 13/004* (2013.01)
USPC ........................................................ 307/147

(58) Field of Classification Search
USPC ...................................... 307/1, 147; 375/260
See application file for complete search history.

(56) References Cited

U.S. PATENT DOCUMENTS

| 5,412,689 A | 5/1995 | Chan et al. |
| 5,553,097 A | 9/1996 | Dagher |

(Continued)

FOREIGN PATENT DOCUMENTS

| EP | 0 352 869 A2 | 1/1990 |
| JP | 2002-118605 A | 4/2002 |
| JP | 2006-229959 A | 8/2006 |

OTHER PUBLICATIONS

PCT International Search Report and Patentability Report for PCT Application No. ES2008/000496, 10 pages, Feb. 12, 2008.

(Continued)

*Primary Examiner* — Carlos Amaya

(57) ABSTRACT

A system including a coupler to couple a signal to a plurality of conductors of an electric network and a transmitter to select a plurality of modes to inject the signal into the plurality of conductors and to transmit the signal via the plurality of conductors. The plurality of modes is selected from a group consisting of a first mode, a second mode, and a third mode. The first mode includes injection of the signal through a selective combination of the plurality of conductors and circulation of current through ground. The second mode includes injection of the signal through a first conductor and return through a second conductor. The third mode includes injection of the signal through one or more first conductors and return through one or more second conductors. The first conductors are different than the second conductors.

22 Claims, 14 Drawing Sheets

(51) Int. Cl.
  *H02B 1/20* (2006.01)
  *H02G 5/06* (2006.01)
  *H04B 3/54* (2006.01)
  *H04B 3/32* (2006.01)
  *H04L 25/02* (2006.01)
  *H04L 5/14* (2006.01)
  *H04L 5/00* (2006.01)
  *H04J 13/00* (2011.01)

(56) References Cited

U.S. PATENT DOCUMENTS 6,226,330 B1  5/2001  Mansur

2006/0171476 A1*  8/2006  Broyde et al. ............... 375/257
2006/0187971 A1   8/2006  Lum et al.

OTHER PUBLICATIONS

Summary of Notice of Reasons for Rejection for related Japanese Application No. 2010-519480; Ryuka IP Law Firm; Dec. 11, 2012; 2 pages.

Summary of Notice of Reasons for Rejection for related Japanese Application No. 2010-519480; Ryuka IP Law Firm; Mar. 19, 2013; 2 pages.

T.H. Nguyen and T.R. Scott, Propogation Over Multiple Parallel Transmission Lines Via Modes, IBM Technical Disclosure Bulletin, vol. 32 No. 11 Apr. 1990.

* cited by examiner

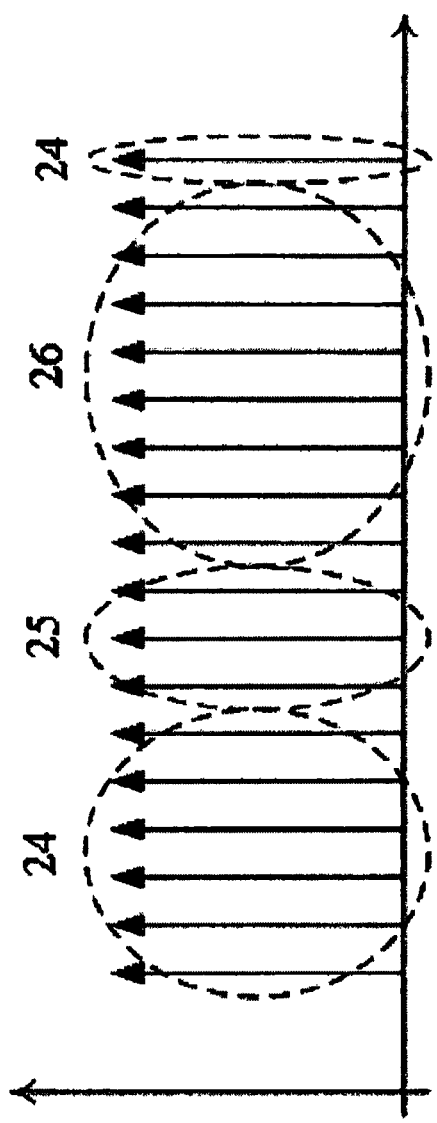

SIGNAL INJECTION THROUGH ELECTRIC NETWORK USING DIFFERENT MODES

CROSS-REFERENCE TO RELATED APPLICATIONS

This is a continuation of U.S. patent application Ser. No. 12/672,863, filed on Jun. 2, 2010 (now U.S. Pat. No. 8,587,159 issued on Nov. 19, 2013), which is a National Stage Application claiming the priority PCT Application No. PCT/ES2008/000496, filed on Jul. 14, 2008, which claims priority from Spanish Application Serial No. P200702256, filed on Aug. 9, 2007. The entire disclosures of the applications referenced above are incorporated herein by reference.

OBJECT OF THE INVENTION

As expressed in the title of this specification, the present invention relates to a method for increasing the performance of a communications system on a medium formed by multiple conductors.

In any communications system, the attempt is made to use to a maximum the characteristics of the communication medium to achieve maximum transmission capacity, reliability, coverage, etc. In the event that the communications medium is formed by multiple conductors, it is possible to use said conductors to achieve one or several of these objectives.

The method described in the present invention is used in a medium formed by multiple conductors both to improve the performance of the communication, and to increase the reuse of used frequencies, or to improve repetition, among other applications.

BACKGROUND OF THE INVENTION

Communications systems need a transmission medium for signals that is often formed by multiple conductors. The presence of these multiple conductors can be used to improve different features of the communications system, such as the transmission capacity or noise immunity, among others. Although this problem has been considered and some more or less valid solutions have been found in the past, the present invention presents a new solution which optimally uses the multiplicity of conductors for increasing the performance of the transmission in the medium.

The conventional concepts which are used in the present invention are described below. "Mode" is understood as the injection of voltage or current on a selective combination of conductors, reference plane or both. Likewise, "orthogonal multi-injection" is defined as an injection of multiple modes orthogonal to one another. The injection modes are divided into common mode, differential modes and pseudo-differential modes. The common mode is what causes the circulation of currents through the reference plane. The differential modes consist of the injection through one conductor and the return through another one, whereas the pseudo-differential modes consist of the injection of voltage or current between one or more conductors and the return through one or more conductors different from those used for the injection, the number of conductors used in this case being more than two.

The patent "Space time coded data transmission via inductive effect between adjacent power lines" (GB238372A), describes the use of multiple paths for the communications signal on the electric network and in the digital processing application for identifying in each node the best time periods and frequency for communicating. Furthermore, in this document, the channel is treated as a system of multiple inputs and multiple outputs wherein the signal is coupled between the different conductors to reach the nodes through several paths. This document does not affect the novelty or the inventive step of the present invention, because orthogonal multiple injections are not performed on a multi-conductor medium, but rather a different method is applied to perform the communications which seeks to use the crosstalk between conductors instead of eliminating it.

On the other hand, the publications "A novel approach to the modeling of the indoor power line channel Part I: Circuit analysis and companion model" (IEEE Trans. Power Del., vol. 20, no. 2, pp. 655-663, April 2005) and "A novel approach to the modeling of the indoor power line channel Part II: Transfer function and channel properties" (IEEE Trans. Power Del., vol. 20, no. 3, July 2005) analyze the channel formed by the electric network as a transmission medium in homes, assimilating it to the theory of multi-conductor transmission lines (MTL), for the purpose of achieving a realistic model for said channel. This does not affect the novelty or the inventive step of the present invention because the invention is based on the increase of the performance of a communications system by means of the orthogonal multi-injection of signals, independently of the model used for the channel.

Another publication of the state of the art is entitled "High-Frequency characteristics of overhead multi-conductor power lines for broadband communication" (IEEE Jour. Communications, Vol. 24, no. 7, July 2006), and presents another advanced model for the channel formed by the electric network as a transmission medium in overhead medium voltage transmission lines. For the same reasons indicated above, this document does not affect the novelty or inventive step because the method of the present invention can be applied independently of the modeling performed on the communications channel.

On the other hand, the publication "Characteristics of power line channels in cargo ships" of Tsuzuki, Yoshida, Yamada, Kawasaki, Mrai, Matsuyam and Suzuli (IEEE 1-4244-1090-8/07) describes the manner of characterizing the electric network of the cables of a cargo ship, wherein the wiring is double-stranded with a grounded shield. To that end, one and the same signal is injected in a common and differential manner (dual mode transmission), and it is received in a differential manner, whereby signal conversion by crosstalk is used to achieve less attenuation with respect to the use of only differential transmission. In other words, this publication seeks to have a single communications channel from a system of several strands. The present invention uses orthogonal injection modes in N cables seeking to achieve up to N independent communication channels, using said orthogonality for increasing the performance of a communication system preventing crosstalk instead of enhancing it, which is neither anticipated nor is it an evident result for a person having average skill in the art from this publication.

The state of the art prior to the present patent also includes the publication "Vectored Transmission for Digital Subscriber Line Systems" (George Ginis, John M. Cioffi, IEEE Journal On Selected Areas in Communications, Vol. 20, No. 5, June 2002) in which the manner of increasing the transmission rate in a bundle of twisted pairs is described, wherein the injection in said twisted pairs is done in a differential manner, coordinating the transmissions and using techniques for multiple input and multiple output (MIMO) to cancel the crosstalk. As occurs with other documents of the state of the art, this does not anticipate the present invention the method of which is based on orthogonal injections on N conductors to increase the performance of a communications system.

A patent from the technological background relating to the problems to be resolved is the so-called "Phantom Use in DSL systems" with publication number US 2006/0268966. This patent uses a common mode which is superimposed on the signals which are sent in a bundle of twisted pairs (referred to as phantom mode) wherein the injection in said twisted pairs is done in a differential manner. This generates a new path for the communication using the radiation produced by this mode. The present patent uses orthogonal multi-injections for creating new channels, so it does not affect this patent.

Finally, the publication "Submission to Working Group T1E1.4" (GDSL, Gigabit DSL, J. Cioffi et al., T1E1.4/2003-487R1) can also be related to the state of the art. In this publication, differential injections on twisted pairs using a conductor chosen as a reference for the return signal are used. As on previous occasions, this document does not affect the novelty or inventive step, because the method described in this patent is based on orthogonal multi-injection on N conductors, and not on differential injections, to increase the performance of the communications system.

DESCRIPTION

To achieve the objectives and prevent the drawbacks indicated in previous sections, the invention consists of a method for increasing the performance of a communications system on a medium formed by multiple conductors and a reference plane, wherein the number of conductors will generally be N. Said method is characterized in that communication signals are injected in up to N modes, one mode being the injection of voltage or current on a selective combination between conductors, reference plane or both, such that said modes are orthogonal to one another.

Although up to N modes can be used, there is a mode which causes the circulation of currents through the reference plane. This mode is the so-called common mode. In specific cases, for example when radiations are to be reduced to a minimum, the use of the injection causing the transmission in common mode can be prevented, so only differential modes, pseudo-differential modes and combinations thereof will be used.

Generally, the method is suitable for any medium with multiple conductors, one of these media being the electric network.

An application of the method consists of the transmitting equipment simultaneously injecting in up to N modes of the differential, pseudo-differential and common modes in the communication process, such that the transmission capacity in the communications system is multiplied without using extra digital processing.

In a particular case, the transmitting equipment injects a signal simultaneously on the same bandwidth or frequency range to achieve the multiplication of the transmission capacity.

Another possible application of the method of the invention is to increase the attenuation between communications networks and to improve the coexistence of said networks in one and the same medium. To that end, each of the communication networks coexisting in one and the same physical medium will use a different set of injection modes, from among the N possible modes, such that the sets of injection modes selected by the different communication networks are disjunctive.

In multiple communications systems, it is necessary to use repeaters so that the signal from one piece of equipment can reach other distant equipment (in terms of attenuation). Said repeaters are usually frequency repeaters, i.e., they communicate with a group of nodes using a frequency band and repeat the signal for another group of nodes using another different frequency band. This type of repeaters normally use coexistence filters to cancel out the interference between the different frequency bands used for repeating. By applying the method of the invention, said repeaters can be made to use different injection modes from among the N possible modes, such that the specifications of the filters necessary for reducing the interference between the different frequency bands used by the repeater are relaxed, or even the need for said filters is eliminated.

Another case of interference when using frequency repeaters occurs when the equipment forming the communications system reuses the same frequencies in remote links. In this case, interference will occur between equipment using the same frequencies, unless the pieces of equipment are so far from each other (in terms of attenuation) that the signals sent by one piece of equipment cannot be distinguished from the ground noise picked up by the other piece of equipment. The method of the invention can be used to improve this case, so the pieces of equipment forming the communication system will reuse the same frequencies without causing interference among one another by means of using different injection modes in the communication equipment of the remote links, such that greater flexibility is allowed in the reuse of frequency ranges in the planning of communications networks.

The method can also be used to improve the reliability of the communication, so multiple versions of the communications signal will be transmitted in the injection modes used to subsequently combine them at reception.

The use of multiple injection modes at transmission and at reception allows applying techniques for the multiple input and multiple output (MIMO) digital processing of communications signals, in the injection modes used from among the N possible modes. As a result, it is possible to improve the performance of the communication.

One of the MIMO techniques that can be applied is space-time coding. In this case, the method is applied together with space-time coding techniques consisting of distributing the communications signal among the injection modes used, such that the coding gain and diversity are exploited at the same time.

Another possibility is that techniques for the transmission through channel eigenvectors (eigenmode transmission) are applied together with the inventive method at transmission and at reception to allow the receiver to decode the signals received through each of the injection modes used.

A third possibility is that the method includes techniques for digital processing which allow canceling the interference or crosstalk between the injection modes used at reception, such that it increases the signal-to-noise ratio (SNR) detected in each of said injection modes, and thereby the performance of the communications.

Another application of the method is to achieve bidirectional communications. In the event that the communications system is formed by two pieces of equipment, these pieces of equipment are bidirectionally communicated at the same time (full-duplex communication) for which purpose a first piece of equipment uses a set of injection modes from among the N possible modes to transmit to the second piece of equipment and another set of different injection modes to receive the signals from the second piece of equipment, whereas the second piece of equipment uses the first set to receive and the second set to transmit, wherein said sets are disjunctive.

In the event that the system is formed by multiple pieces of equipment, the method is characterized in that a piece of equipment transmits simultaneously to other pieces of equipment using a set of injection modes for the transmission to each piece of receiving equipment, wherein said sets are disjunctive.

Likewise, another possible application of the method is that a piece of equipment receives simultaneously from other pieces of equipment using a set of injection modes for the reception from each piece of transmitting equipment, wherein said sets are disjunctive.

The transmissions performed by different injection modes typically experience the channel characteristics in different ways: attenuation, interference, noise threshold, etc. In a specific case, it is possible to use only the injection modes having the best characteristics for communication, such that the robustness and performance of the communications system are improved.

There are many ways to select which injection modes are suitable modes. Some examples of the communication characteristics which allow selecting the injection modes are: the noise present in the injection mode, the interference present in the injection mode, the stability of the channel in the injection mode, the radiation caused by the injection mode, the attenuation of the channel in the injection mode or a combination of the foregoing.

In the event that the communications system uses OFDM modulation and orthogonal multi-injection, different techniques for digital processing, different injection modes or a combination of techniques for digital processing and injection modes can be used in groups formed by one or several OFDM modulation carriers.

A set of drawings is attached below in which the object of the invention is depicted with an illustrative and non-limiting character to aid in better understanding this specification and forming an integral part thereof.

BRIEF DESCRIPTION OF DRAWINGS

FIG. 15 shows an example of a cluster of OFDM modulation carriers for the method of orthogonal multi-injection.

DESCRIPTION OF EMBODIMENTS OF THE INVENTION

Figure 1:
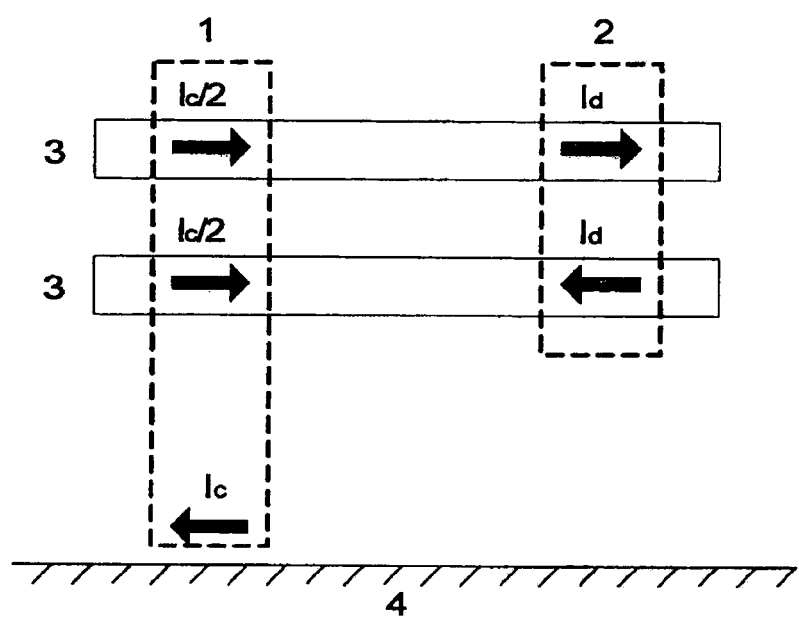
FIG. 1 shows the modes of propagation through the transmission medium formed by two parallel conductors, using orthogonal injection modes.

Several embodiments of the invention are described below making reference to the numbers used in the drawings.

The problem which the method of the invention wishes to resolve, from a theoretical point of view, consists of how to use the property that the transmission medium is formed by multiple conductors to maximize the performance of a communications system using said transmission medium.

Before describing several embodiments of communication systems using the method of the invention, the multi-conductor medium will be theoretically analyzed, which will allow justifying the validity of the method of the invention. From a theoretical point of view, it is possible to mathematically describe a multi-conductor medium with N parallel conductors referring to a reference plane which conduct signals between a source and a load by means of the MTL (multi-conductor transmission line) theory. The dominant mode of propagating these signals is the transverse electromagnetic mode (TEM), in which both the electric field and the magnetic field are propagated orthogonally in the plane perpendicular to the axis of the conductors. These structures can propagate signals from direct current (zero frequency) to frequencies with a wavelength comparable to the size of the cross section of the conductor. The MTL theory for parallel conductors can be used more reliably for modeling the more dominant the TEM modes are. When frequency increases, they will begin to be contributive modes of a greater order than TEM and, therefore, the approaches made by the MTL theory will no longer be valid. Even when the TEM mode is dominant, the medium is actually not homogenous and the spatial geometry or the intrinsic characteristics thereof are not maintained, making them quasi-TEM modes, the propagation and isolation characteristics of which between injections are impaired. In any case, the MTL theory is used to describe the basis on which the method of the invention is supported.

The signals that are injected in the different conductors of the medium, generate an electromagnetic field causing signal coupling between conductors, the so-called crosstalk being generated. One of the main purposes of the MTL theory is to predict said crosstalk.

The MTL theory in the simplest case of two conductors is reduced to having two modes for the spatial propagation of the signal, the common mode and the differential mode. It is typically the differential mode that is used to transport the energy of the data signals which are transmitted in actual applications (for example, communications through the electric network). The common mode is injected in both conductors and the return is through the reference plane or ground, whereas the differential mode consists of injecting through one conductor and the return through the other one. The common mode has greater losses and the added drawback of radiating more than the differential mode, making its use more limited at the level of complying with emissions regulating standards. Even when trying to avoid the common mode, any differential signal propagated through a channel will have a common mode conversion factor due to asymmetries and unbalancing of the channel.

When the injection modes used are orthogonal, according to the MTL theory there will not be any interference between them. This can be mathematically verified considering a system of equations of the currents through each conductor or the voltages therein. For N conductors and a reference plane there will be N orthogonal injection modes. In particular for the currents and considering the currents in the N conductors, the following system is reached:

$$\begin{bmatrix} \tilde{I}_1 \\ \tilde{I}_2 \\ \vdots \\ \tilde{I}_N \end{bmatrix} = A * \begin{bmatrix} I_c \\ I_{d1} \\ \vdots \\ I_{pd1} \\ \vdots \end{bmatrix}$$

wherein $$A = \begin{bmatrix} a_{11} & a_{12} & \cdots & a_{1N} \\ a_{21} & \cdots & & a_{2N} \\ \vdots & \cdots & & \vdots \\ a_{N1} & \cdots & & a_{NN} \end{bmatrix}$$

Wherein $\tilde{I}_i$, (i=1 ... N) is the current passing through the conductor i, $I_c$ is the common mode current, $I_{di}$ (i=1 ... k) are the differential mode currents, $I_{pdi}$ (i=1 ... s) are pseudo-differential mode currents and $a_{ij}$ (i=1 ... N, j=1 ... N) is the contribution factor of the current of each mode to the current through the conductor i. It is not possible to use any combination to generate a suitable differential or pseudo-differential mode; only those showing orthogonality with respect to the remaining modes used will be valid (according to the system of equations provided above).

According to the MTL theory, the system relating the currents through the conductors with the currents of each mode is orthogonal, i.e., it is an independent linear system, and furthermore the current vectors of each mode are orthogonal. Since it is an independent system, the range of the matrix A is equal to N; whereas since the modes are orthogonal, the product of the matrix A transposed by A is a diagonal matrix.

FIG. 1 shows an example of the propagation modes existing in the specific case of the electric network when injecting in common mode (1) and in differential mode (2), when the network is formed by only two conductors (3) and the reference plane or ground circuit (4). The common mode current $I_c$ is distributed through the multiple conductors and returns through the reference plane, whereas the differential current is injected through one conductor and returns through the other one.

When the transmission medium is made up of three conductors, the propagation modes will be the same as with two conductors, plus a mode referred to as pseudo-differential mode, in which the current circulates through two of the conductors and returns through the third one. As with the differential mode, the pseudo-differential has optimal characteristics for signal propagation since it has low attenuation in the channel, and it is orthogonal to the other two, as can be mathematically shown.

Figure 2:
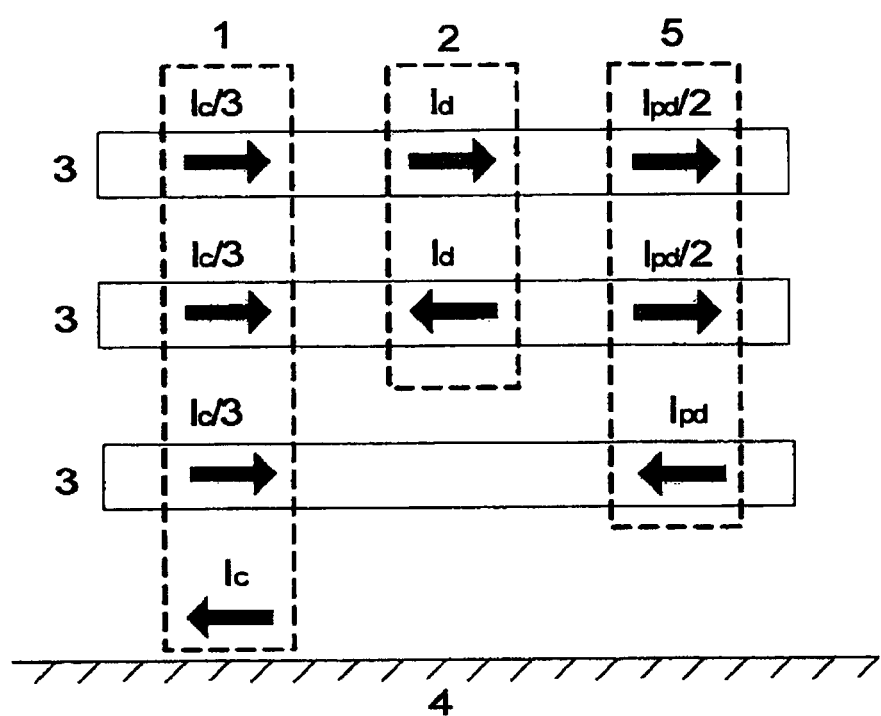
FIG. 2 shows the modes of propagation through the transmission medium formed by three parallel conductors, using orthogonal injection modes.

FIG. 2 shows the orthogonal injection modes for the case of the electric network formed by three conductors (3) together with the reference plane (4). In this case, in addition to the common mode (1) and the differential mode (2), the injection can be performed in a pseudo-differential manner (5).

From these values it is possible to extrapolate the injection modes for N parallel conductors with reference plane by applying the MTL theory, wherein there will be N possible injections of orthogonal signals. The following table shows the number of injection modes of orthogonal signals clustered by type (common, differential and pseudo-differential) depending on the number of conductors:

|  | 3 conductors | 4 conductors | 7 conductors | 12 conductors | N conductors (N odd) | N conductors (N pair) |
| --- | --- | --- | --- | --- | --- | --- |
| No. of injections Common mode | 1 | 1 | 1 | 1 | 1 | 4 |
| No. of injections Differential mode | 1 | 2 | 3 | 6 | $\frac{N-1}{2}$ | $\frac{N}{2}$ |
| No. of injections Pseudo-differential mode | 1 | 1 | 3 | 5 | $\frac{N-1}{2}$ | $\frac{N-1}{2}$ |

Figure 3:
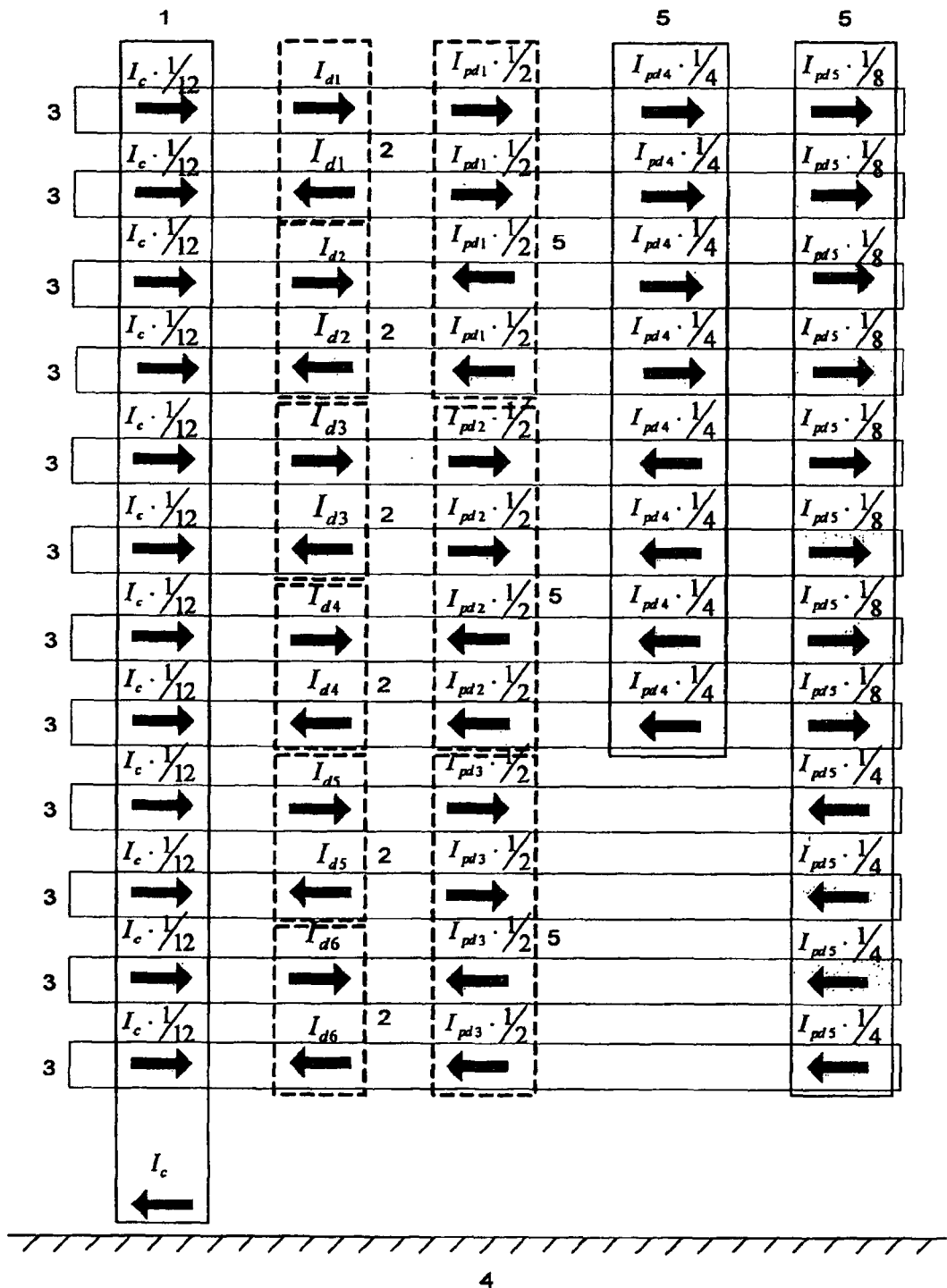
FIG. 3 depicts the orthogonal injection modes allowable in a medium formed by twelve parallel conductors.

To check the orthogonal injections with an example, assume a medium with twelve conductors (3), such as that shown in FIG. 3. Said figure includes twelve injection modes and it is desired to be known if they are orthogonal. The orthogonality of the matrix of currents will be checked by considering the following system of equations:

$$\begin{pmatrix} \tilde{I}_1 \\ \tilde{I}_2 \\ \tilde{I}_3 \\ \tilde{I}_4 \\ \tilde{I}_5 \\ \tilde{I}_6 \\ \tilde{I}_7 \\ \tilde{I}_8 \\ \tilde{I}_9 \\ \tilde{I}_{10} \\ \tilde{I}_{11} \\ \tilde{I}_{12} \end{pmatrix} = \begin{pmatrix} I_c \\ I_{d1} \\ I_{d2} \\ I_{d3} \\ I_{d4} \\ I_{d5} \\ I_{d6} \\ I_{pd1} \\ I_{pd2} \\ I_{pd3} \\ I_{pd4} \\ I_{pd5} \end{pmatrix} = \begin{pmatrix} 1/12 & 1 & 0 & 0 & 0 & 0 & 0 & 1/12 & 0 & 0 & 1/4 & 1/8 \\ 1/12 & -1 & 0 & 0 & 0 & 0 & 0 & 1/12 & 0 & 0 & 1/4 & 1/8 \\ 1/12 & 0 & 1 & 0 & 0 & 0 & 0 & -1/12 & 0 & 0 & 1/4 & 1/8 \\ 1/12 & 0 & -1 & 0 & 0 & 0 & 0 & -1/12 & 0 & 0 & 1/4 & 1/8 \\ 1/12 & 0 & 0 & 1 & 0 & 0 & 0 & 0 & 1/12 & 0 & -1/4 & 1/8 \\ 1/12 & 0 & 0 & -1 & 0 & 0 & 0 & 0 & 1/12 & 0 & -1/4 & 1/8 \\ 1/12 & 0 & 0 & 0 & 1 & 0 & 0 & 0 & -1/12 & 0 & -1/4 & 1/8 \\ 1/12 & 0 & 0 & 0 & -1 & 0 & 0 & 0 & -1/12 & 0 & -1/4 & 1/8 \\ 1/12 & 0 & 0 & 0 & 0 & 1 & 0 & 0 & 0 & 1/12 & 0 & -1/4 \\ 1/12 & 0 & 0 & 0 & 0 & -1 & 0 & 0 & 0 & 1/12 & 0 & -1/4 \\ 1/12 & 0 & 0 & 0 & 0 & 0 & 1 & 0 & 0 & -1/12 & 0 & -1/4 \\ 1/12 & 0 & 0 & 0 & 0 & 0 & -1 & 0 & 0 & -1/12 & 0 & -1/4 \end{pmatrix} \cdot \begin{pmatrix} I_c \\ I_{d1} \\ I_{d2} \\ I_{d3} \\ I_{d4} \\ I_{d5} \\ I_{d6} \\ I_{pd1} \\ I_{pd2} \\ I_{pd3} \\ I_{pd4} \\ I_{pd5} \end{pmatrix}$$

This system is an independent linear system (since the range of A is equal to twelve), and the product of the transpose ($A^t$) of A by matrix A is diagonal, whereby the chosen injections are orthogonal.

$$A^t, A = \begin{pmatrix} 1/12 & 0 & 0 & 0 & 0 & 0 & 0 & 0 & 0 & 0 & 0 \\ 0 & 2 & 0 & 0 & 0 & 0 & 0 & 0 & 0 & 0 & 0 \\ 0 & 0 & 2 & 0 & 0 & 0 & 0 & 0 & 0 & 0 & 0 \\ 0 & 0 & 0 & 2 & 0 & 0 & 0 & 0 & 0 & 0 & 0 \\ 0 & 0 & 0 & 0 & 2 & 0 & 0 & 0 & 0 & 0 & 0 \\ 0 & 0 & 0 & 0 & 0 & 2 & 0 & 0 & 0 & 0 & 0 \\ 0 & 0 & 0 & 0 & 0 & 0 & 2 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 0 & 0 & 0 & 0 & 0 & 0 & 0 & 1 & 0 \\ 0 & 0 & 0 & 0 & 0 & 0 & 0 & 0 & 0 & 1/2 & 0 \\ 0 & 0 & 0 & 0 & 0 & 0 & 0 & 0 & 0 & 0 & 3/8 \end{pmatrix}$$

In practical applications, it is often appropriate to prevent the use of the common mode injection for reasons of electromagnetic interference, so it is preferable to use, at most, a total of N−1 injection modes. On the other hand, both crosstalk between modes and the unbalancing of the transmission medium make the common mode level increase as the different signals are propagated through the medium, increasing radiation and therefore the losses of differential and pseudo-differential signals. Despite the degradation of the signal, the inventive method allows, among other applications, maintaining a useful signal level that is sufficient for using the possibility of having the bandwidth of the medium multiplied by a factor of up to N−1 (without using the common mode), without having increased the frequency spectrum used, i.e., injecting different signals using the same bandwidth in the channel and improving by N−1 the number of signals between an emitter and a receiver or between an emitter and several receivers.

Several embodiments of communications systems are described below in which the inventive method is used for increasing the performance of said communications.

An immediate application of the method of the invention is a communication system in which the transmitter simultaneously injects up to N different modes of the possible modes (differential, pseudo-differential and common modes) to multiply the transmission capacity of the system with the advantage of not needing any extra digital processing and without expanding the frequency range.

Figure 4:
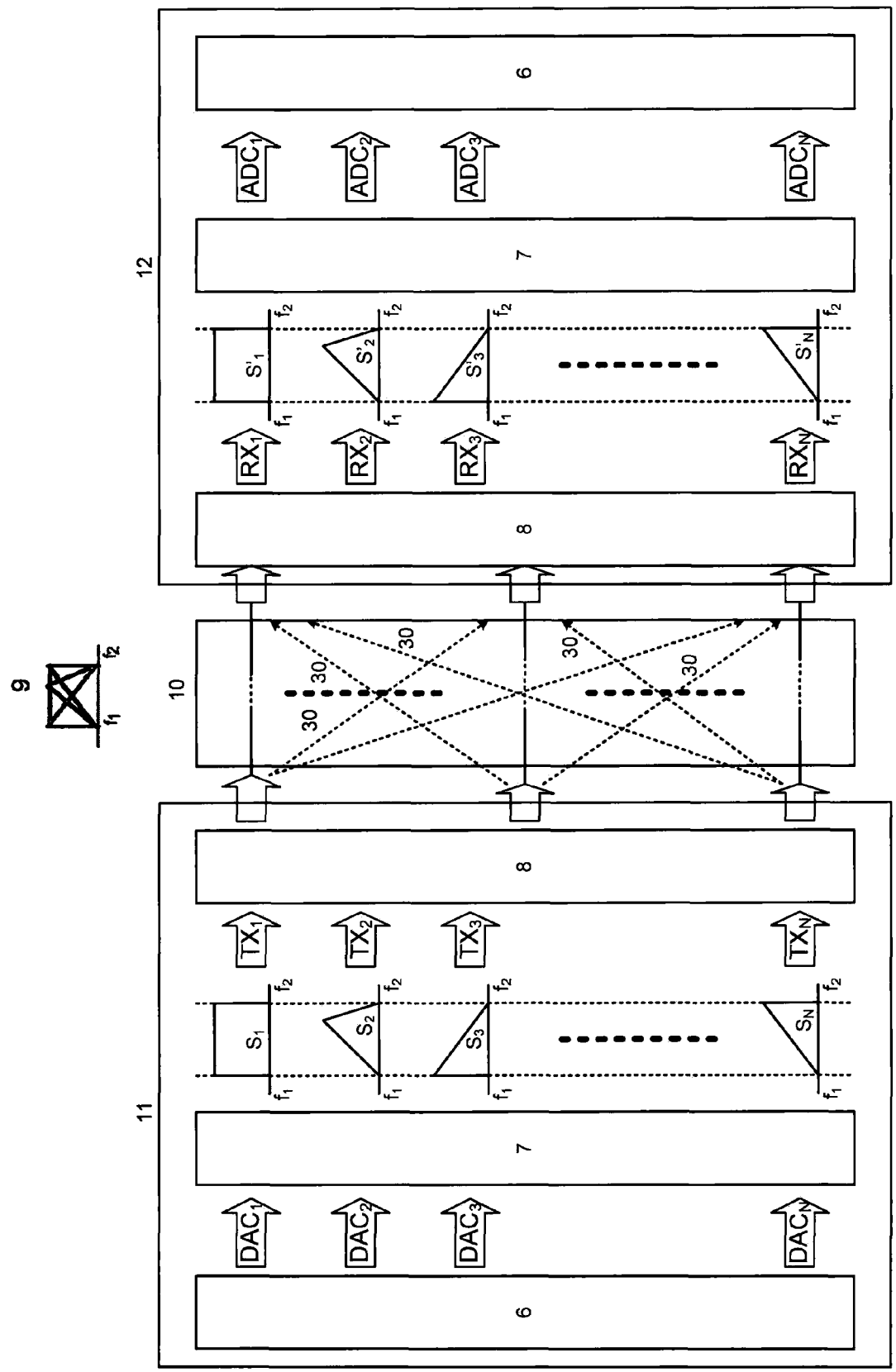
FIG. 4 shows a general transmitter-transmission medium-receiver scheme in which N orthogonal injection modes are used simultaneously in a point-to-point link.

An example of simultaneous orthogonal multi-transmission in a point-to-point link such as the one just described can be seen in FIG. 4, in which there is a transmitting node (11) and a receiving node (12) which are communicated by a transmission medium (10) formed by N conductors on a bandwidth limited by the frequencies $f_1$ and $f_2$. The crosstalk is also depicted in this figure by means of dotted lines (30). The output of the modulator/demodulator (6) of the transmitter consists of N different signals which are converted from digital to analog ($DAC_1$ to $DAC_N$). Each signal is amplified analogically (AFE module) (7) ($S_1$ to $S_N$) and are injected ($TX_i$ to $TX_N$) orthogonally into the medium (10) through the coupler (8). Therefore, the signal on the transmitter medium is a signal formed by N signals on the same bandwidth (9). The opposite is done at reception, taking the signals with the coupler (8), which will be affected by the communication channel ($S'_1$ to $S'_N$) characteristics, obtaining N signals ($RX_1$ to $RX_N$), amplifying them with an AFE module (7). The signals are then passed to the digital domain ($ADC_1$ to $ADC_N$), and are finally introduced in the modulator/demodulator (6) to retrieve the transmitted information.

The use of the method of the invention in this embodiment allows having the communication bandwidth multiplied by the number of injections without using other frequency bands different from the ones already used for a single injection.

Another embodiment of the method of the invention improves the coexistence of networks sharing one and the same transmission medium. Any communication system has a maximum operating range in terms of maximum distance that can be reached due to the attenuation of the medium, the interference of nodes of other networks and the noise present in the medium, among other degradations. Beyond this range, the communication between nodes cannot be carried out. When the element limiting the operating range of a node is the presence of a signal from another node belonging to another communications network sharing the medium, the signal will experience degradation of its performance due to this interference. Said nodes must coexist in the same medium, and it would be desirable for said coexistence to be carried out with the lowest possible loss of performance.

Furthermore, in certain communications systems, it is desirable that two nodes located within the communication range cannot communicate with one another for different reasons. In these cases, coexistence presents even more difficulties, since signal interference is so great that it makes the communication between both nodes possible. In these cases, it is possible to apply message exchange techniques to share time, frequency or other magnitudes allowing the transmission of both nodes without interference.

In this framework, the use of the method of the invention allows two nodes within the communication range to operate independently without negatively affecting the performance due to the interference between them.

There are different techniques allowing networks to coexist, from time, frequency multiplexing, to different coding or encrypting techniques. On the other hand, the lower the interfering power of one network in another one with which it shares the medium, the easier it is to coexist, and in any case, the repercussion this would have on the performance of both networks will be less.

By applying the method on coexisting communications systems, the attenuation between networks present in one and the same medium is greater, provided that each of them uses a different injection mode, even when using the same frequency band.

Figure 5:
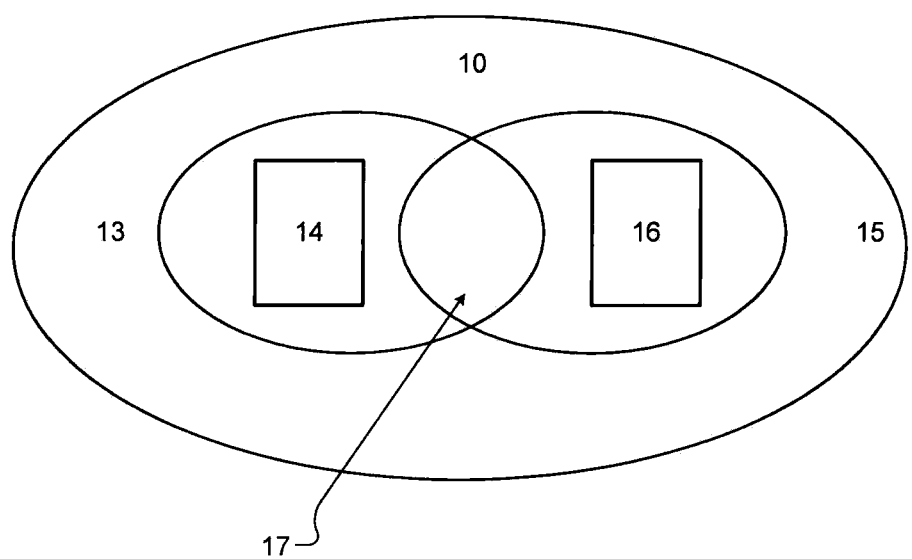
FIG. 5 depicts a typical case of interference between two networks sharing the same physical medium in which they must coexist.

FIG. 5 shows two networks, each of which has to provide coverage to an area, Network 1 (13) provides coverage a Area 1 (14), whereas Network 2 (15) provides coverage to Area 2 (16). Both networks share the physical medium (10) and will generally have a larger area of action than the area which they should cover. This is a determining factor for interference between networks. The greater the power transmitted by a network, the greater its coverage or range and the more possibilities it will have of interfering with other networks. In this case there is an area of interference (17) in which the signals of both networks are mixed. Reducing the power transmitted by the network would improve the coexistence with other networks but, in most cases, it would impair the performance in its own coverage area, so it is actually not a feasible solution.

In this case, if orthogonal injection modes are used between the different networks that must coexist, the attenuation between the nodes belonging to each network is increased, such that interference between them decreases without needing to reduce the transmitted power.

On the other hand, in communications systems with signal repetition, the method of the invention can also be applied for increasing the performance of the systems. In a communications network formed by multi-conductors, it is possible that the necessary coverage is not reached and it is necessary to use repeaters which allow increasing the coverage area of the network. Repeaters typically use time division techniques (TDD) or frequency division techniques (FDD). In the case of TDD techniques, with the multi-injection used the bandwidth of the channel is increased without increasing the frequencies used, this means that the reduction of the performance involved in TDD in a network is minimized when taking into account the performance of the network as a whole.

In the case of frequency division (FDD), two possibilities are considered. On one hand, the main principal of FDD is that it is often necessary to reuse frequency bands, which involves having links using the same frequencies on the same medium, whereby it is possible for the pieces of equipment of these links to interfere with one another. The multi-injection described in the invention can be used to increase the attenuation between these remote links and thereby reduce possible interference. Using orthogonal injection modes between the remote links decreases the interference between them and thereby improves the performance of the links individually and of the network in general.

On the other hand, when FDD techniques are used, to prevent interference in adjacent links using different frequency bands, coexistence filters preventing this interference are applied. The use of multi-injection techniques such as the one described in the invention can help to relax the specifications of these filters and to even eliminate their need, provided that different injection modes are used between the adjacent links, given that these injections have greater attenuation between one another than if the same injection mode is used in the two links.

Figure 6:
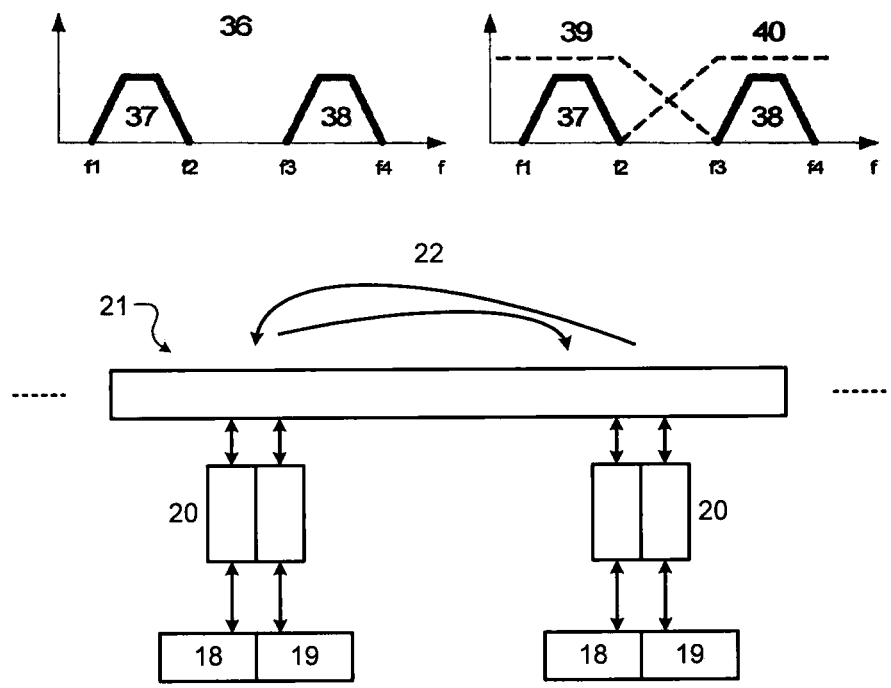
FIG. 6 shows a scheme of interferences between links in a network with frequency division and the spectral position of the signals and the transfer functions of the coexistence filters necessary for preventing interferences.

This embodiment can be seen in FIG. 6, in which there are pieces of equipment using band A (18) and other pieces using band B (19). This causes interference between adjacent links (21), which can be solved by using the coexistence filters (20), and interference between remote links (22). The same figure always shows a spectral representation (36) in which band A (37) occupies the spectrum f1 to f2, whereas band B (38) occupies the spectrum f3 to f4. The transfer functions of the coexistence filters (20) are also depicted, in this case the filter (39) for taking only band A (37) rejects the frequencies exceeding f3, whereas the filter (40) for taking only band B (38) rejects the frequencies lower than f2.

The use of the method allows relaxing the characteristics of these coexistence filters in adjacent links and even eliminating them under certain conditions.

It is therefore also allowed that the pieces of equipment forming the communication system and reusing the same frequencies minimize interference between one another by means of using different orthogonal injection modes in each of the links. Overall performance of the communication systems can thus be increased and the planning of the network made easier.

Another application of the method of the invention is the capacity of achieving full-duplex communication between pieces of equipment, i.e., transmitting and receiving information simultaneously between the pieces of equipment, using orthogonal multi-injection.

Figure 7:
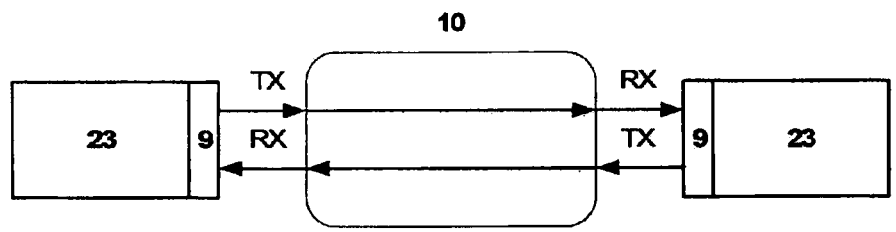
FIG. 7 shows a generic full-duplex communication scheme between two pieces of equipment.

When there are two communication channels in one and the same medium, it is possible to implement full-duplex communication between two pieces of equipment, provided that the interference between channels allows maintaining the performance. This can be observed in FIG. 7 in which two pieces of equipment (23) transmit and receive at the same time on a transmission medium (10).

In the case of generating two communication paths between a transmitter and a receiver this possibility is available. This is the case of applying the method of the invention on three conductors, wherein the differential mode and the pseudo-differential mode can be used, one to transmit/receive in one direction and the other to transmit/receive in the other direction.

Figure 8:
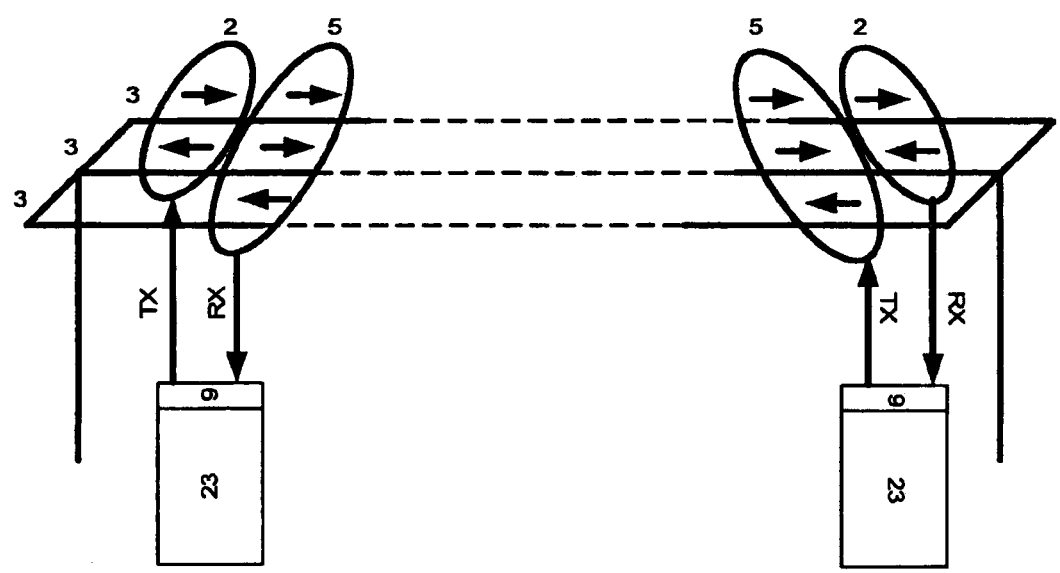
FIG. 8 depicts a full-duplex communication scheme on overhead medium voltage power line with three phases, in which the method of orthogonal multi-injection is used.

An example can be a medium voltage line of the electric network with broadband communication equipment, as can be seen in FIG. 8. If the network is a three phase network, it is possible to perform a multi-injection on three conductors, wherein a differential mode (2) and a pseudo-differential mode (5) are injected, so a full-duplex channel is obtained using the same frequency band on the same communications channel between the equipment (23).

The method of the invention can be applied together with techniques for MIMO (multiple-input, multiple-output) to improve the performance of the communications system using said techniques. In fact, a communication medium with several strands is equivalent to MIMO (multiple-input, multiple-output) schemes (N×N). It is possible to achieve greater effectiveness and yield by applying diversity, space-time coding and eigen-beamforming techniques, or other similar techniques, together with the method of the invention. The use of orthogonal multi-injection allows obtaining channel matrices that are better conditioned, so the application of techniques for MIMO will be more efficient.

Figure 9:
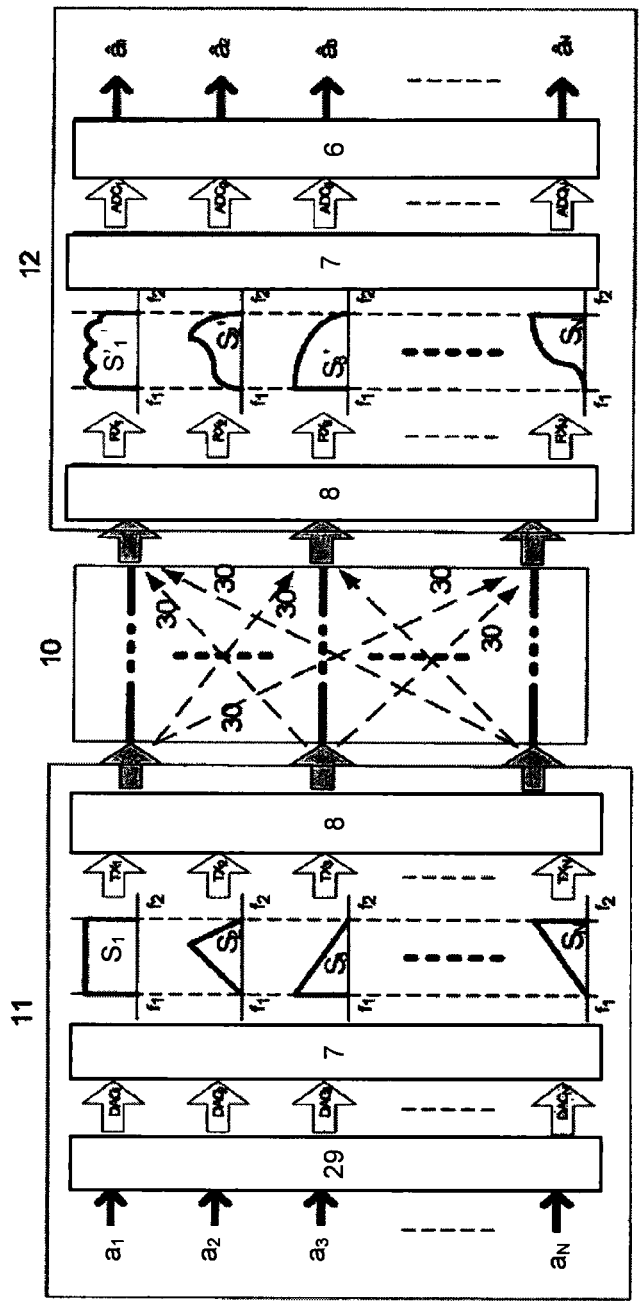
FIG. 9 shows the general transmitter-transmission medium-receiver scheme in which MIMO processing is used at transmission and reception.

FIG. 9 shows an embodiment in which the system uses MIMO digital processing and the method of the invention. This example continues the general scheme of the communications system shown in the previous figures and a module for the digital processing of multiple input signals ($a_1 \ldots a_N$) and multiple output signals (29) is included therein. The crosstalk or interference between the injected signals (30) that can be used or reduced using MIMO digital processing has been marked in the figure in this case.

Figure 10:
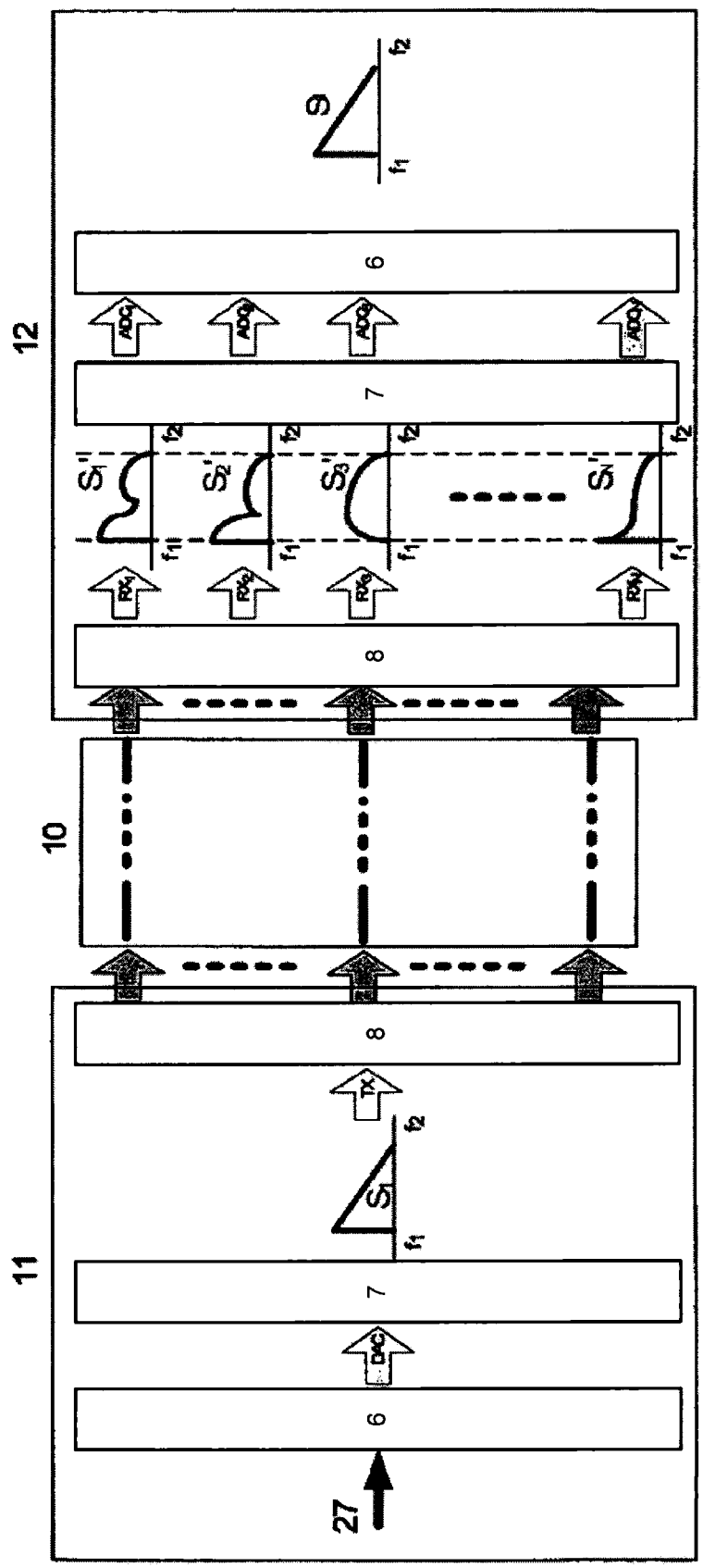
FIG. 10 shows the general transmitter-transmission medium-receiver scheme in which the same signal is injected orthogonally in the multi-conductor medium and as many signals as those which are injected, propagated by different modes, are received.

On one hand, diversity techniques in the field of telecommunications relate to an improvement of the reliability of a signal traveling through a medium, using two or more communication channels with different characteristics. These techniques exploit the different characteristics of the N communication channels to increase the robustness of the receiver, to prevent chain bit errors and to control signal fading. The method consists of transmitting multiple signal versions which are combined in the receiver to improve the reliability of the communication. Error correction techniques can be incorporated in the different transmitted signals in different parts of each message of each channel. The embodiment of FIG. 10 shows a system in which the inventive method is used together with the transmission of multiple versions of one and the same communications signal in the injection modes used and the result is combined at reception. It is thus possible to improve the reliability of the communication. FIG. 10 shows this example, in which the symbol to be transmitted (27) is processed digitally (6), passes to the analog domain and is suitably amplified (7) and finally coupled (8), introducing the same signal with each of the orthogonal injection modes. The opposite is done at reception, taking the signal of each orthogonal injection, amplifying it and finally making a combination (28) of the obtained signals. This combination consists of multiplying each signal by a weight (which depends in this embodiment on the signal-to-noise ratio perceived in the channel formed by the orthogonal injection) and adding the results to try to obtain the symbol sent. The replica of the transmitted signal and its combination at reception allows increasing the reliability of the communication even in scenarios that are extremely degraded due to noises or interferences.

Figure 11:
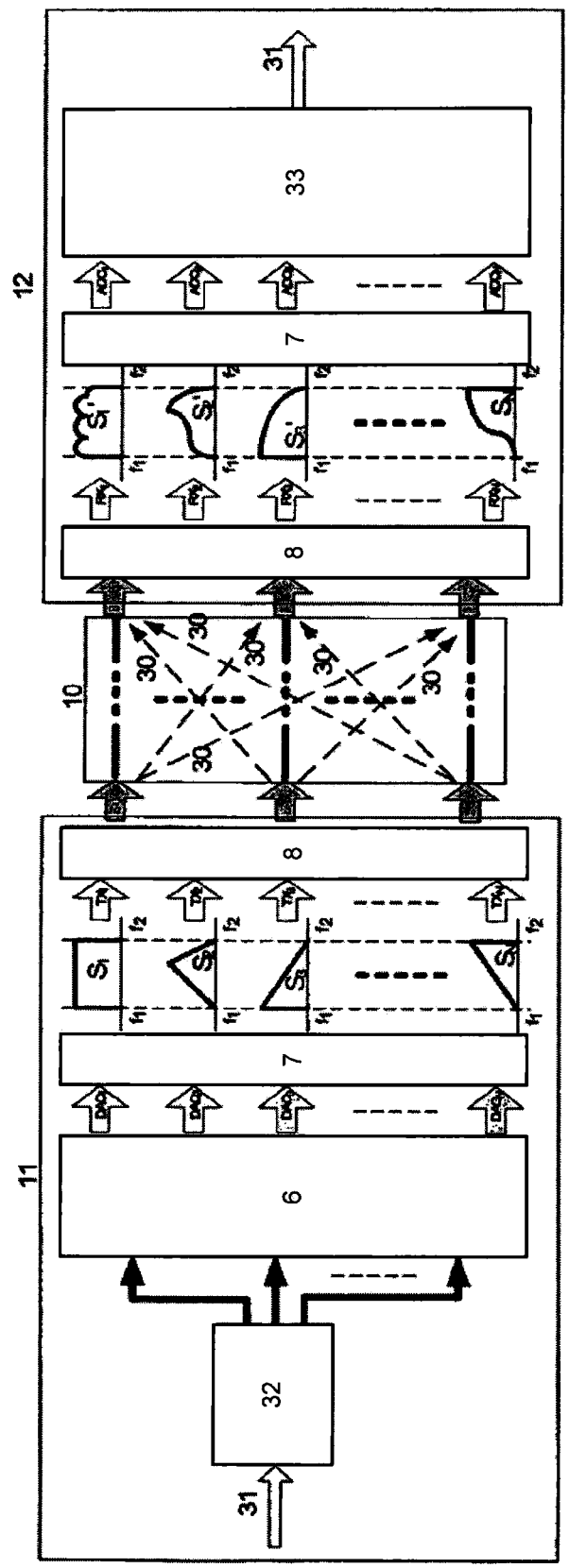
FIG. 11 depicts the particularization of the generic scheme of the previous figure when space-time coding techniques are used.

On the other hand, the method of multi-injection can be applied to spatial diversity, wherein the signal is transmitted through different paths of the same medium. Diversity combining techniques can be used before signal processing, selecting the strongest signal reaching the receiver, changing the channel when the signal does not have a minimal performance, or coherently adding up all the receptions, using MRC (maximal-ratio combining) wherein weights are applied to the received signals depending on the signal-to-noise ratio (SNR) of each one, before adding up the receptions. The previously mentioned techniques can be extended, giving rise to space-time coding techniques. By means of this coding, the information and the redundancy are uniformly distributed among the N communication paths to exploit the diversity and coding gain of determined codes at the same time. A specific example can be seen in FIG. 11, in which the digital processing module (29) for processing multiple input signals ($a_1 \ldots a_N$) and multiple output signals ($DAC_1 \ldots DAC_N$) of FIG. 9 has been replaced at transmission with a space-time coder (32) which the symbols to be transmitted (31) reach. At reception, the digital processing is replaced with a space-time demodulating and decoding module (33) which obtains the digital symbols (31) sent from the transmitter.

Figure 12:
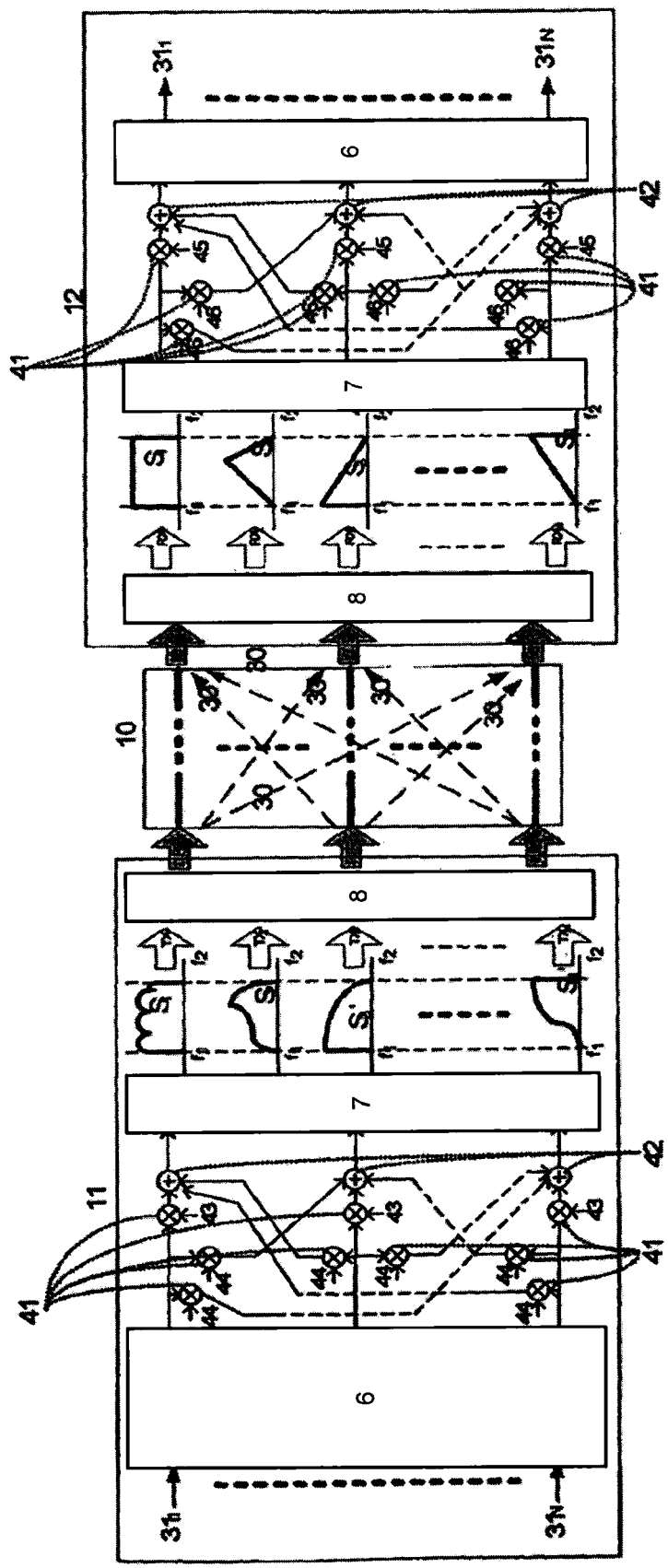
FIG. 12 depicts the particularization of the generic scheme of FIG. 10 when transmission techniques through the channel eigenvectors are used.

On the other hand, there are techniques for MIMO for maximizing the speed which can benefit from the extra isolation caused by orthogonal injections. Results approaching ideal results can be obtained in actual situations by means of combining the injection and digital processing. If the response of the N channels is known in the transmitter, techniques for transmission through the channel eigenvectors (eigenmode transmission) can be used together with the method of the invention to achieve this. These techniques apply a transformation at transmission and reception which allows the receiver to optimally decode the signals received. If, in contrast, the processing is left only to the receiver, techniques for canceling the interference (crosstalk) between the N channels can be used to increase the signal-to-noise ratio (SNR) in each of them. In other words, the isolation provided by orthogonal injections can be increased by means of digital processing. A specific embodiment of MIMO processing will consist of techniques for transmission through the channel eigenvectors which linearly combine the signals to be transmitted in each of the injection modes (by means of products and sums of the signals obtained from digital processing) and the signals received in each of the injection modes. FIG. 12 shows this embodiment, wherein N symbols (31) are introduced in digital processing (6) and the outputs are linearly combined by means of multipliers (41) and adders (42) with weights (generally different for the transmitter (43) and (44) and for the receiver (45) and (46)) the value of which is calculated depending on the specific transmission medium of the application. Processing at reception is identical to the processing performed at transmission.

Figure 13:
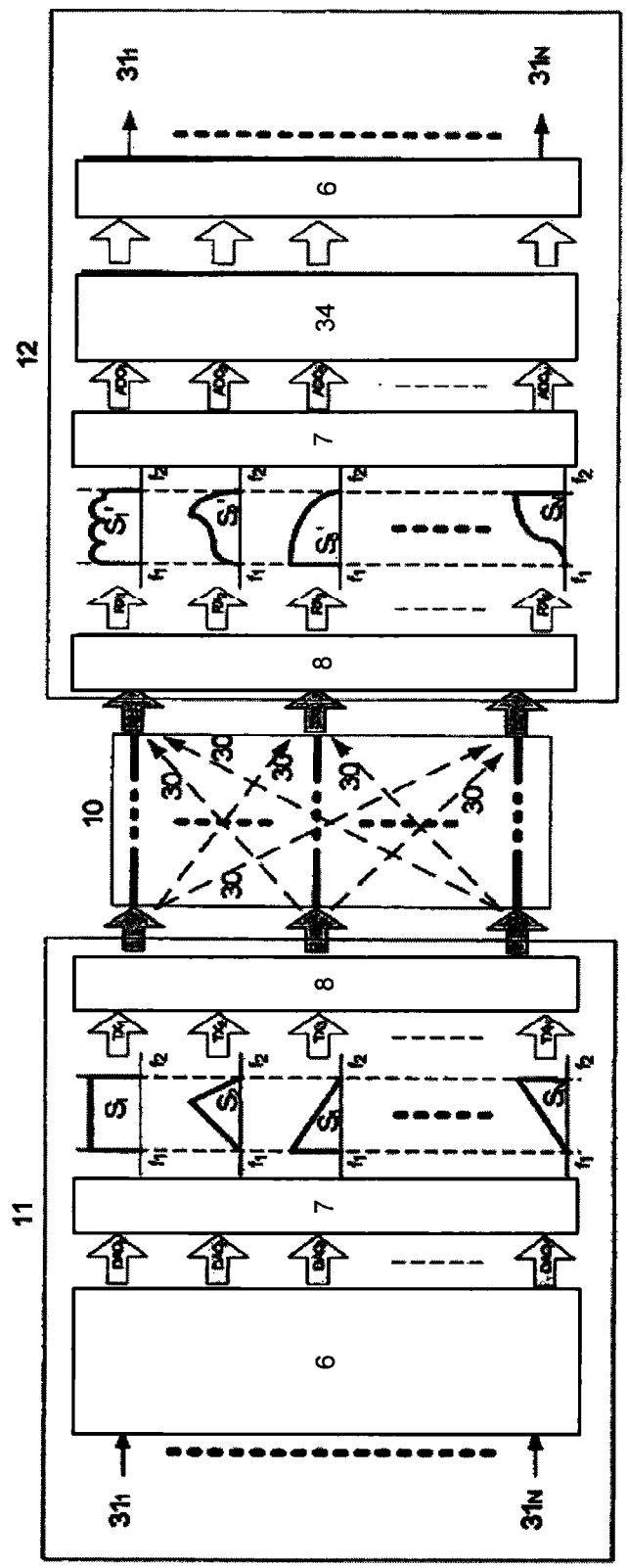
FIG. 13 depicts the particularization of the generic scheme of FIG. 10 when the attempt is made to minimize crosstalk between the multi-injection channels.

On the other hand, MIMO processing can also be used to reduce and even eliminate crosstalk between channels (30). To that end, the scheme seen in the example of FIG. 13 can be used, wherein the receiver includes a crosstalk canceller (34) which reduces interference of the other injection modes on each of the injection modes due to crosstalk.

Figure 14:
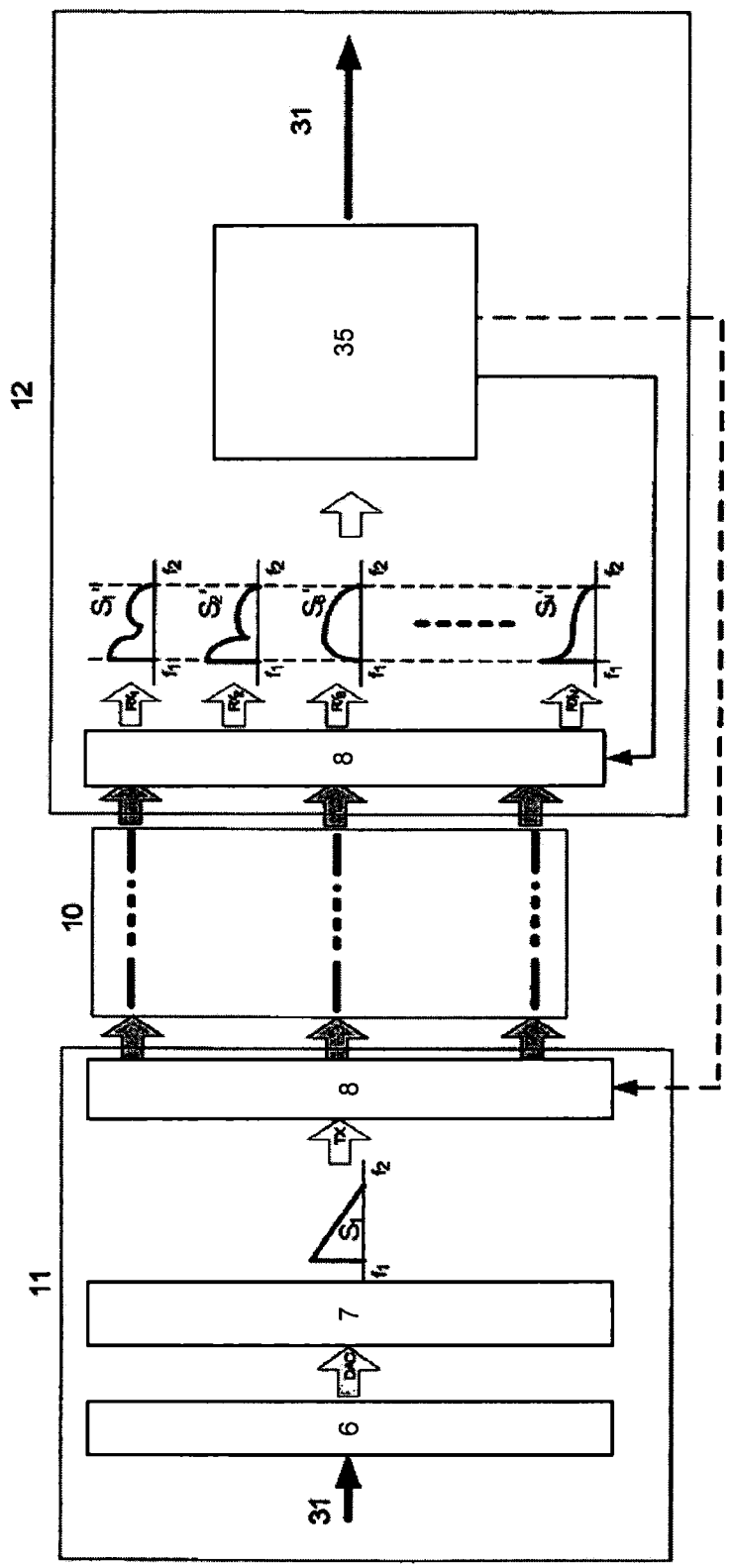
FIG. 14 shows the general transmitter-transmission medium-receiver scheme in which the receiver selects which injection is most suitable for the communication from the signal received.

Another embodiment of the invention consists of applying the method of the invention in a communications system such that the same signal is transmitted through the N conductors using the orthogonal injection modes, and at reception only the injection modes having the best characteristics are used for communication. In a specific embodiment, which can be seen in FIG. 14, those injection modes having less noise, a higher SNR, less interference, etc, are selected as suitable. This selection is done by means of a module (35) at reception which analyzes the chosen characteristic of the signals arriving through the different injection modes and thereby selects which coupler (8) will be activated at reception. This module can also send a control signal to the transmitter (11) such that orthogonal multi-injection is performed only in the channels selected by the selector block (35), which it communicates to the coupler (8) of the transmitter (11).

Finally, another example of the application is the inclusion of the inventive method in communications systems using OFDM modulation. In this case, techniques for digital processing or different injection modes can be used depending on the groups of carriers that are made. In a specific embodiment, such as the one shown in FIG. 15, the OFDM modulation carriers have been distributed into three groups. It can also be seen that the carriers of the first group (24) are not consecutive in frequency. In this specific embodiment, a pseudo-differential injection mode is used in a first group (24), and no extra signal processing is used. In the second group (25), it simultaneously injects in differential and pseudo-differential mode and no extra signal processing is used either, the isolation provided by the injection between the orthogonal modes being sufficient for separating the signals at reception. In the carriers of the third group (26), it simultaneously injects in differential and pseudo-differential mode, and techniques for MIMO are applied. The different carriers are assigned to each of the groups (24), (25) or (26) based on the characteristics of the channel in the frequency of each carrier or based on other application-dependent criteria.

What is claimed is:

1. A system comprising:
   a coupler configured to couple a signal to a plurality of conductors of an electric network; and
   a transmitter configured to
      select a plurality of modes to inject the signal into the plurality of conductors; and
      transmit the signal via the plurality of conductors of the electric network;
      wherein the plurality of modes is selected from a group consisting of (i) a first mode, (ii) a second mode, and (iii) a third mode;
      wherein the first mode includes (i) injection of the signal through a selective combination of the plurality of conductors, and (ii) circulation of current through ground;
      wherein the second mode includes (i) injection of the signal through a first conductor of the plurality of conductors, and (ii) return through a second conductor of the plurality of conductors; and
      wherein the third mode includes (i) injection of the signal through one or more first conductors of the plurality of conductors, and (ii) return through one or more second conductors of the plurality of conductors, wherein the first conductors are different than the second conductors.

2. The system of claim 1, wherein the plurality of modes are orthogonal.

3. The system of claim 1, wherein a number of the plurality of modes is equal to a number of the plurality of conductors.

4. The system of claim 1, wherein the transmitter is configured to transmit multiple versions of the signal in each of the plurality of modes.

5. The system of claim 1, wherein the transmitter is configured to increase a bandwidth by a factor of up to a number of the plurality of modes without increasing frequencies used to transmit the signal.

6. The system of claim 1, wherein in presence of one or more transmitters belonging to a coexisting network, the transmitter is configured to transmit the signal without needing to reduce transmit power in order to reduce interference with the one or more transmitters.

7. The system of claim 1, wherein the transmitter is configured to reuse frequencies used by a remote transmitter by selecting modes different than those used by the remote transmitter.

8. The system of claim 1, wherein the transmitter is configured to communicate with another transmitter in full-duplex mode by selecting the second mode and the third mode.

9. The system of claim 1, wherein the transmitter is configured to transmit the signal through different paths, the system further comprising:
a space-time coder configured to code the signal using a space-time code prior to transmission in order to uniformly distribute information and redundancy among the different paths to exploit diversity and coding gain at the same time.

10. The system of claim 1, wherein the transmitter is configured to transmit the signal using eigenmode transmission, wherein signals to be transmitted in each of the plurality of modes are linearly combined.

11. The system of claim 1, wherein the transmitter is configured to:
receive a control signal from a remote receiver indicating channels to use for injecting the signal when transmitting the signal to the remote receiver, and
inject the signal in the channels indicated by the control signal.

12. A method comprising:
selecting a plurality of modes to inject a signal into a plurality of conductors of an electric network;
wherein the plurality of modes is selected from a group consisting of (i) a first mode, (ii) a second mode, and (iii) a third mode;
wherein the first mode includes (i) injection of the signal through a selective combination of the plurality of conductors, and (ii) circulation of current through ground;
wherein the second mode includes (i) injection of the signal through a first conductor of the plurality of conductors, and (ii) return through a second conductor of the plurality of conductors; and
wherein the third mode includes (i) injection of the signal through one or more first conductors of the plurality of conductors, and (ii) return through one or more second conductors of the plurality of conductors, wherein the first conductors are different than the second conductors;
coupling the signal to the plurality of conductors of the electric network; and
transmitting the signal via the plurality of conductors of the electric network.

13. The method of claim 12, wherein the plurality of modes are orthogonal.

14. The method of claim 12, wherein a number of the plurality of modes is equal to a number of the plurality of conductors.

15. The method of claim 12, further comprising transmitting multiple versions of the signal in each of the plurality of modes.

16. The method of claim 12, further comprising increasing a bandwidth by a factor of up to a number of the plurality of modes without increasing frequencies used to transmit the signal.

17. The method of claim 12, further comprising, in presence of one or more transmitters belonging to a coexisting network, transmitting the signal without needing to reduce transmit power in order to reduce interference with the one or more transmitters.

18. The method of claim 12, further comprising using frequencies used by a remote transmitter by selecting modes different than those used by the remote transmitter.

19. The method of claim 12, further comprising communicating with another transmitter in full-duplex mode by selecting the second mode and the third mode.

20. The method of claim 12, further comprising:
transmitting the signal through different paths; and
coding the signal using a space-time code prior to transmission in order to uniformly distribute information and redundancy among the different paths to exploit diversity and coding gain at the same time.

21. The method of claim 12, further comprising transmitting the signal using eigenmode transmission, wherein signals to be transmitted in each of the plurality of modes are linearly combined.

22. The method of claim 12, further comprising:
receiving a control signal from a remote receiver indicating channels to use for injecting the signal when transmitting the signal to the remote receiver; and
injecting the signal in the channels indicated by the control signal.

* * * * *